(12) United States Patent
Eudes

(10) Patent No.: US 7,692,485 B2
(45) Date of Patent: Apr. 6, 2010

(54) MODULATION METHOD WITH INSERTION OF SEMI-PILOT SYMBOLS

(75) Inventor: Jacques Eudes, Asnieres (FR)

(73) Assignee: Thales (FR)

( * ) Notice: Subject to any disclaimer, the term of this patent is extended or adjusted under 35 U.S.C. 154(b) by 51 days.

(21) Appl. No.: 12/066,141

(22) PCT Filed: Sep. 11, 2006

(86) PCT No.: PCT/EP2006/066233

§ 371 (c)(1),
(2), (4) Date: Jul. 29, 2008

(87) PCT Pub. No.: WO2007/028835

PCT Pub. Date: Mar. 15, 2007

(65) Prior Publication Data

US 2008/0309403 A1    Dec. 18, 2008

(30) Foreign Application Priority Data

Sep. 9, 2005    (FR) .................................. 05 09219

(51) Int. Cl.
*H04L 27/00*    (2006.01)
*H04L 27/22*    (2006.01)

(52) U.S. Cl. ...................................... 329/304; 375/324
(58) Field of Classification Search ......... 329/304–310; 37/324–328
See application file for complete search history.

(56) References Cited

U.S. PATENT DOCUMENTS

2004/0202142 A1    10/2004    Batariere et al.
2005/0271088 A1*   12/2005    Shoemake et al. .......... 370/528

FOREIGN PATENT DOCUMENTS

WO    2007/028835 A2    3/2007

* cited by examiner

*Primary Examiner*—David Mis
(74) *Attorney, Agent, or Firm*—Lowe Hauptman Ham & Berner, LLP

(57) ABSTRACT

Method and device for modulating a signal comprising data symbols and reference symbols, characterized in that it comprises at least one step (3) wherein semi-pilot symbols are introduced that transport less information than the symbols customarily used but enough to obtain decisions decided during a decoding step (9), the semi-pilot symbols being disposed between the data symbols and the reference symbols.

9 Claims, 5 Drawing Sheets

MODULATION METHOD WITH INSERTION OF SEMI-PILOT SYMBOLS

CROSS-REFERENCE TO RELATED APPLICATIONS

The present Application is based on International Application No. PCT/EP2006/066233, filed on Sep. 11, 2006, which in turn corresponds to French Application No. 05 09219 filed on Sep. 9, 2005, and priority is hereby claimed under 35 USC §119 based on these applications. Each of these applications are hereby incorporated by reference in their entirety into the present application.

FIELD OF THE INVENTION

The invention relates notably to a method and a modem making it possible to optimize decoding by inserting symbols of intermediate quality. These intermediate quality symbols are called "semi-pilot symbols" in the description which follows.

BACKGROUND OF THE INVENTION

The invention applies notably in the field of satellite transmissions. It can also be used in other cases of employment such as sporadic burst transmissions in a multi-path channel. The use of hybrid preamble (reference+subset) makes it possible notably to substantially lengthen the preamble while improving the decoding of the bits transported by the hybrid preamble.

The invention is also used for continuous transmission modes.

The invention can also be beneficial in the case of fast-evolving channels. Specifically, these channels require fast tracking of the channel, which is conventionally obtained by repeating the preambles with a small period.

The use of powerful codes, such as turbo codes, makes it possible to reduce the values of the signal-to-noise ratio denoted by the abbreviation SNR that are necessary for transmitting a message. This reduction brings demodulators ever nearer to the limits of their channel estimation capability. This is all the more true as the decrease in SNR allows a rise in spectral efficiency related to the use of more complex constellations, for example, the 16 QAM constellation (the abbreviation standing for quadrature amplitude modulation), the 32 APSK constellation (the abbreviation standing for amplitude phase shift keying), etc. The coding schemes obtained, often BICMs (the abbreviation standing for Bit Interleaved Coded Modulation) make it possible to get still closer to Shannon's theoretical limit, assuming that the modem behaves optimally.

The demodulator must estimate parameters such as the arrival amplitude, the phase, the incident frequency, the multi-path channel, etc. This is all the more difficult as the noise increases.

The currently known methods for solving this problem consist, for example, in periodically adding references at the signal emission level. These references are disposed in blocks or in a discrete manner.

When the demodulation conditions are difficult, such as for example for demodulations in short bursts (burst, TDMA) or when the channel is difficult to demodulate (multi-path channel, considerable phase noise, considerable frequency error or Doppler acceleration), the emission periodically inserts, notably at the start (burst satellite) or in the middle of a burst (GSM or global system mobile), known symbols, called pilot symbols or reference symbols. The insertion of these reference symbols increases the band used and the ratio Eb/N0 corresponding to "the energy per information bit transmitted" and "the white noise spectral density".

When the reference symbols are not sufficiently numerous, the demodulator makes estimation errors which result in noise added to the noise received by the modem. This demodulation noise can degrade the performance of the demodulator or even lead to a dropout of the latter which no error code can remedy. Conversely, when the reference symbols are too numerous there is a loss in terms of spectral efficiency (the inserted symbols do not carry any information) and signal-to-noise ratio (the energy invested in the reference symbols is not used by the decoder).

One of the drawbacks of these techniques is therefore that they make an important difference between the data symbols and the reference symbols.

SUMMARY OF THE INVENTION

The idea of the invention consists notably in introducing symbols "of intermediate quality" or semi-pilot symbols for example between the data symbols and the reference symbols. The expression intermediate quality is understood to mean notably symbols which transport less information than the information symbols conventionally used, but which allow the demodulator better decision-taking for its decided estimations, DD (Decision Directed). These symbols are therefore called semi-pilots by analogy with the pilot symbols which are fully known (so-called reference symbols). It is for example possible to replace a group of R reference symbols and of D data symbols by (R+D) semi-pilot symbols. The modem can then use information of better quality for its DD estimation.

The energy transmitted to the semi-pilot symbols is equivalent to that of the information symbols, but the free distance of the constellation of semi-pilot symbols, that is to say the minimum distance between two distinct points of the constellation is substantially more considerable than for the native constellation. Usually the ratio of the distances is chosen with a factor of at least root 2, i.e. 3 dB in terms of signal-to-noise ratio.

In particular, a method of demodulating a signal according to the invention, comprising data symbols and reference symbols, comprising at least one step wherein use is made of semi-pilot symbols that transport less information than the symbols that are customarily used but enough to obtain weighted decisions of better quality and used by estimators of LMS type, these semi-pilot symbols transporting bits whose better quality benefits the weighted decoder which follows the demodulator.

The method comprises, for example, at least one step wherein use is made of semi-pilot symbols that transport less information than the symbols customarily used but wherein these symbols benefit from a specific coding that is robust enough to obtain decisions without error during a decoding step, the semi-pilot symbols being disposed between the data symbols and the reference symbols. In another step, the result of the decoding is remodulated, and the symbols thus obtained are used as hard reference.

The higher quality of the simple semi-pilots makes it possible, notably, to instigate the first iteration of an iterative demodulation step, that is to say coupled to an error corrector code (usually a turbo code or an LDPC), the semi-pilot symbols being disposed between the data symbols and the reference symbols).

There may be error corrector code unit (usually a turbo code or an LDPC between the information carried by the pilot symbols and the semi-pilot symbols).

The information transported benefits from an unequal protection of the information, that is to say this information is distributed into groups of unequal interest, the most important bits having to benefit an error rate that is lower by at least one order of magnitude. On emission the most important bits are, for example, associated with semi-pilot symbols and coded by a different coding from the other groups. In one step, these bits/symbols are, for example, demodulated and decoded. In a following step, the decoded information, benefiting from the maximum protection, is remodulated to serve as reference symbols for the native symbols. When the decoding is exact, the remodulated symbols have become genuine references. When the decoding is erroneous, the information of the less protected groups is no longer relevant and the use of erroneous symbols is not detrimental to the message which is already lost.

The technique implemented by the invention makes it possible notably to re-synchronize at lesser expense an equalization algorithm of the DFE type (the abbreviation standing for Decision Feedback Equalizer). The use of semi-pilot symbols allows locally correct decision-taking with about half as many reference symbols.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

The idea of the present invention consists notably, at the emission step level, in introducing semi-pilot symbols between data symbols and reference symbols and at the reception step level in using these symbols of intermediate quality to optimize decision-taking at the demodulator level. Certain fully defined pilot symbols are then replaced with semi-pilot symbols. Since the semi-pilot symbols transport information, it is possible (for a constant number of transmitted symbols) to transform certain information symbols into semi-pilot symbols.

Figure 1:
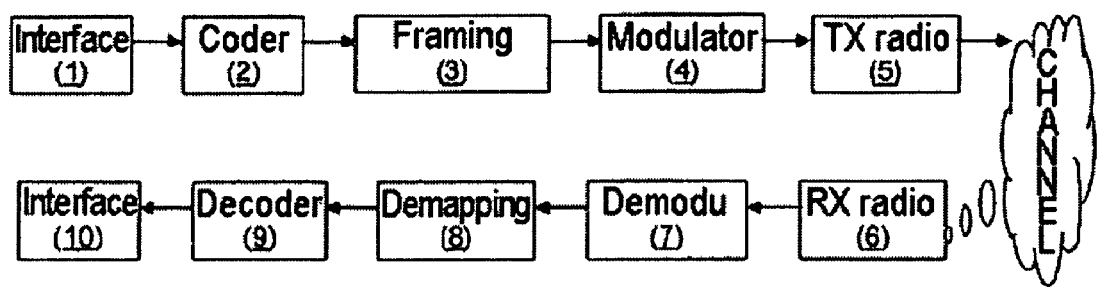
FIG. 1 a diagram of an emission reception system comprising a modulation device on emission and a demodulation device for reception, FIG. 2 a diagram showing a possible temporal distribution for semi-pilot data symbols, FIGS. 3A to 3D, various choices for the constellations and the semi-pilot symbols chosen according to the invention, FIG. 4 a frequency cost function compared for an 8 PSK modem using only reference symbols and for a modem using reference symbols and QPSK, FIG. 5 a frequency cost function compared for a references and QPSK 8 PSK modem and for a modem using references, BPSK and QPSK (mixture), FIG. 6 a Zoom of the cost function in the zone of validity of the Cramer Rao bound.

Shown diagrammatically in FIG. 1 is an emission-reception set. The emission part comprises notably an interface 1 with the digital signal to be emitted (signal composed of reference symbols and data symbols originating from one or more sources). The digital signal is transmitted to a coder 2, then to a framing device 3 whose function is notably to introduce the symbols of intermediate quality or semi-pilot symbols. The frame thus obtained is transmitted to a modulator 4. The modulated signal carrying the symbols of intermediate quality is thereafter transmitted to a radio emitter 5. Without departing from the scope of the invention, the insertion of semi-pilot symbols can be performed by the set consisting of the framing device and modulator.

The modulated signal after passing through the propagation channel is received by a radio receiver 6 then demodulated by a demodulator 7 adapted to utilize the semi-pilot symbols, before being "demapped" 8, then decoded 9. The decoded signal is transmitted to an interface 10.

The device then provides a method of unequal protection of information by adapting the modulation to the relative resistance aimed at for the various data streams.

During transmission, defects such as noise are added to the signal emitted.

Figure 2:
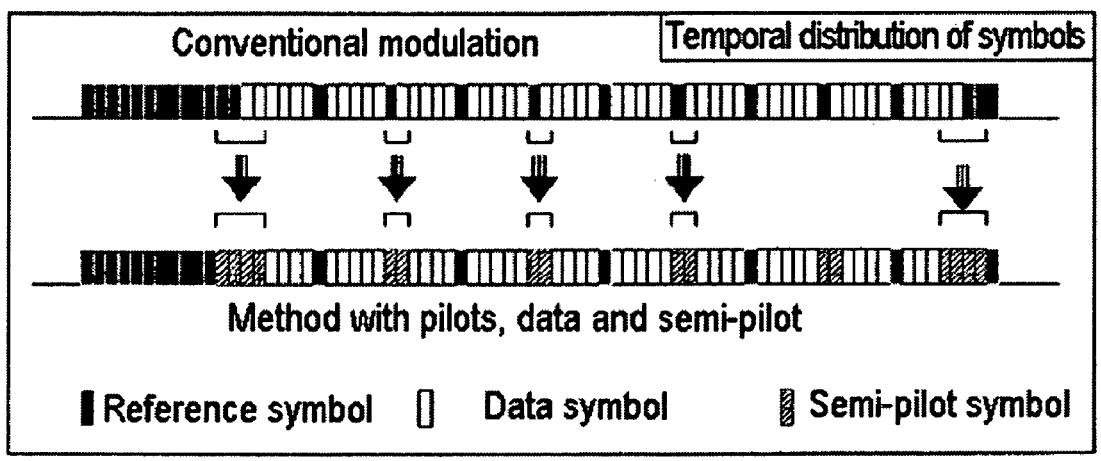

The number of these symbols and the way in which they are distributed temporally in the frame of the signal at the coding level are chosen, for example, as a function of the application aimed at. An example is given in FIG. 2.

The method according to the invention comprises notably a step of inserting semi-pilot symbols between the data symbols and the reference symbols, when the data sources are of different value or importance. The semi-pilot symbols then transmit the information that is most protected.

FIGS. 3A to 3D represent respectively various choices of sub-constellation for various constellations, and a choice of constellation of semi-pilot symbols that are not situated on the native constellation of the information symbols.

A list of constellations and sub-constellations that can be used for the implementation of the invention is given by way of nonlimiting example.

It is possible to choose, for example, a sub-constellation of the constellation used:

BPSK symbols $\{+1, -1\}$, when QPSK modulation is employed $\{+1, +\sqrt{1}, -1, -\sqrt{1-1}\}$, QPSK symbols $\{+1, +i, -1, -i\}$, when 8 PSK modulation is employed: $\exp\{\sqrt{-1}*k*\pi/4; 0 \leq k < 8\}$, QPSK symbols $\{+3+i, -1+3i, -3-i, 1-i\}$ when 16 QAM modulation is employed $\{+a+b+i; a=-3, -1, +1, +3\}$ and $b=\{-3, -1, +1, +3\}$.

It is also possible:

to repeat repeated symbols when BPSK modulation is employed $\{+1, -1\}$, to use another constellation which is not a sub-constellation of the mother constellation used for modulating the signal.

FIGS. 3A to 3D represent examples of use of the modem and the obtaining of semi-pilot symbols on the basis of the reference symbols and data symbols. The example is aimed, for the modem, at minimizing the cost, that is to say the mean square error between the signal received and the signal decided.

Figure 3A:
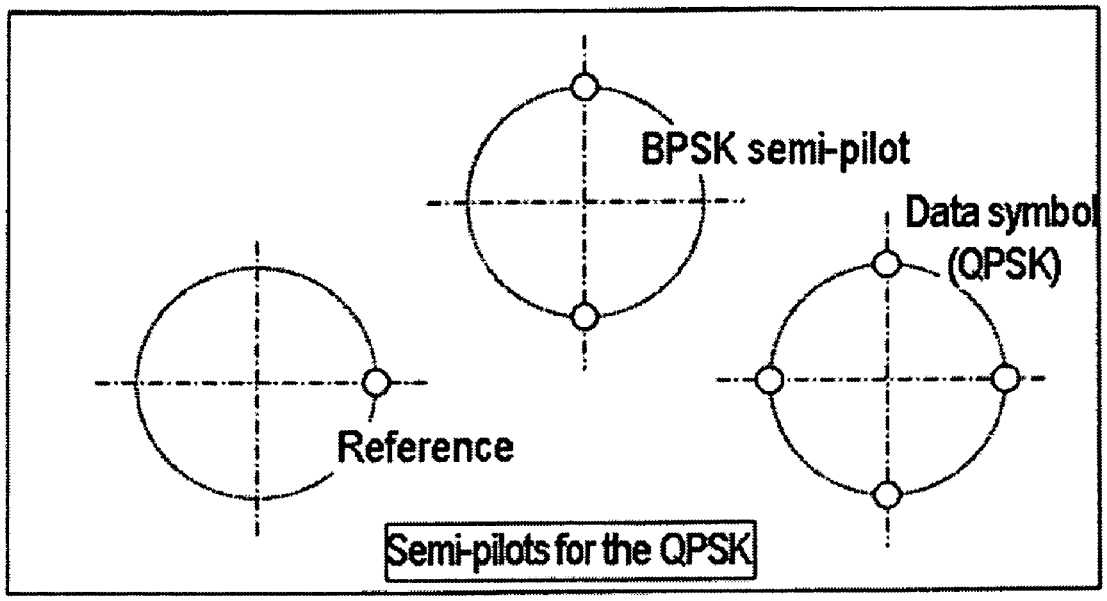

In FIG. 3A, the reference symbols, the data symbols and the semi-pilot symbols obtained have been represented for QPSK modulation.

Figure 3B:
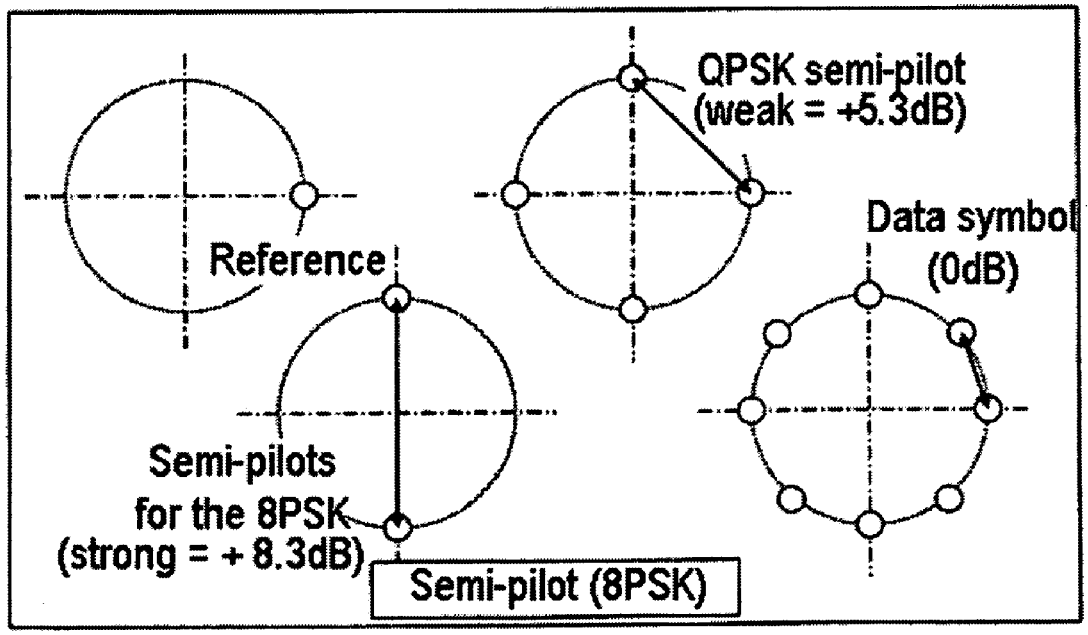

FIG. 3B shows diagrammatically for 8 PSK modulation two possibilities of semi-pilot symbols obtained on the basis of reference symbols and on the basis of the data symbols. Shown diagrammatically is a weak QPSK semi-pilot, increasing the free distance by +5.3 dB and a semi-pilot for BPSK, gaining +8.3 dB.

The example is given for a method in which the transmission uses an 8 PSK modulation associated with a turbo code of rate ⅔. Under these conditions the association of modulation+code demands a signal-to-noise ratio per information bit transmitted Eb/N0 equal to about 6 dB.

The 424 bits are therefore coded, within the framework of a BICM modulation, as 636 bits which require 212 information symbols coded by 8 PSK.

Here the modem adds, for its own synchronization requirements, 32 reference symbols in the form 18 at the start of a packet, 6 at the end of a packet and 6 uniformly distributed in the frame. It therefore transmits 242 symbols.

The method according to the invention transforms the 6 postamble symbols as well as the 12 information symbols modulated by 8 PSK preceding these 6 postamble symbols into 18 information symbols modulated by QPSK, therefore transporting the same number of coded bits. These 18 symbols are, in this example, placed at the end of a packet, to increase the discriminatory ability in regard to the phase rotation at the end of a packet and therefore to the frequency error.

Figure 3C:
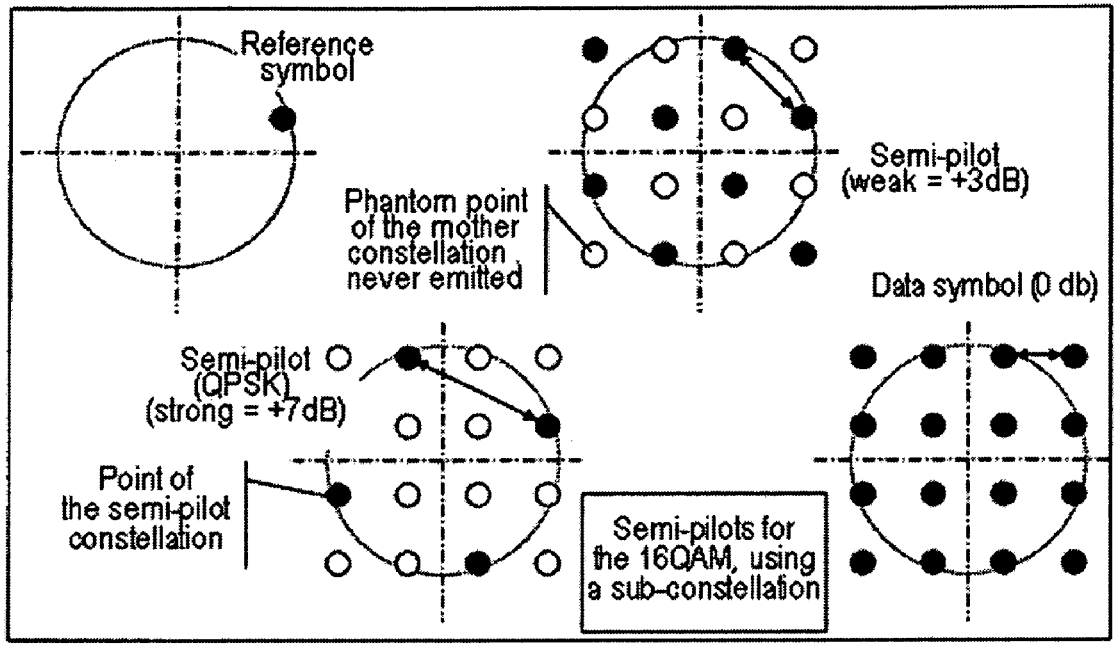

FIG. 3C shows diagrammatically the case of the 16 QAM modulation, with the reference symbol, the data symbol, the points of the semi-pilot constellation shown solid, and the points of the mother constellation which are not used and which appear dotted.

Figure 3D:
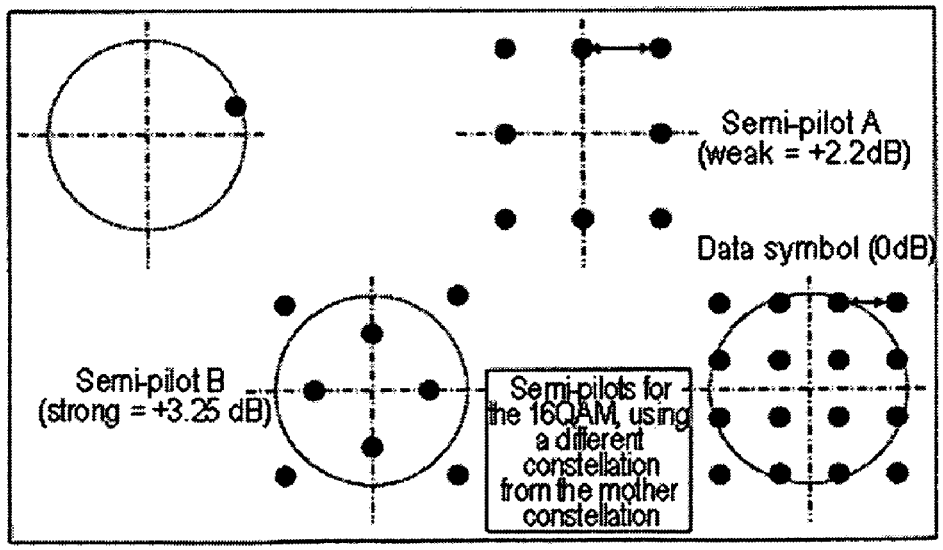

Another case for the 16 QAM modulation is represented in FIG. 3D. There are 2 types of constellation for the semi-pilot symbols:

The set A optimizes the information passed to the decoder while the set B of semi-symbols optimizes the Euclidean distance for a given energy. The set B therefore optimizes the demodulation.

Figure 4:
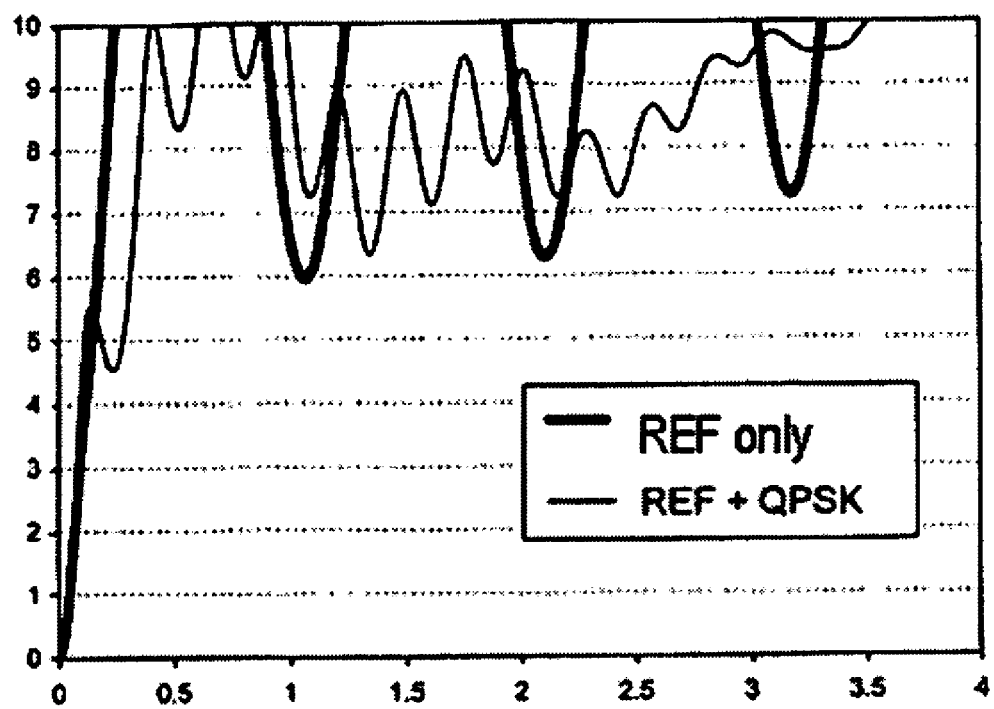

The gain for the modem is illustrated in FIG. 4. The cost versus frequency curve for the "references only" system is below the "references+QPSK" curve.

It is therefore apparent that the modem using the information that the final symbols are QPSK-modulated will have a better estimate in terms of frequency than a modem receiving a burst modulated solely with references and 8 QPSK symbols.

The noise added by the modem during demodulation is therefore weaker in the references=QPSK case and therefore, for equivalent code, the work of the decoder will thereby be improved.

Additionally, during the symbol to bits conversion, better known by the term demapping of the 18 QPSK symbols, the demodulator uses the largest free distance of the QPSK constellation to provide better a priori information on 24 bits of the corresponding 36 bits. This better knowledge results in a gain in regard to the operating point of the decoder. In the present case, the measured gain is 0.3 dB, i.e. a signal-to-noise ratio C/N of 9 dB for an error rate of $10^{-4}$ instead of 9.3 dB for the model with conventional references.

The results of the figure have been obtained by transforming two QPSK symbols into pilot signals consisting of an 8 PSK symbol and of a PSK symbol. In the figure it may be noted that the "Ref+QPSK" curve drops in the vicinity of a rotation of $\pi/2$ on the burst, created by the $\pi/2$ ambiguity of the QPSK symbols has been attenuated by the use of BPSK symbols, which do not suffer this ambiguity.

This transformation benefits the modem (fewer risks of frequency error), but is detrimental to the error corrector code since the latter then sees three 8 PSK bits and a BPSK bit, which carry less information than 4 bits arising from two QPSK symbols.

The "ref+QPSK" and "Ref+BPSK+QPSK" diagrams give the same performance here.

Figure 5:
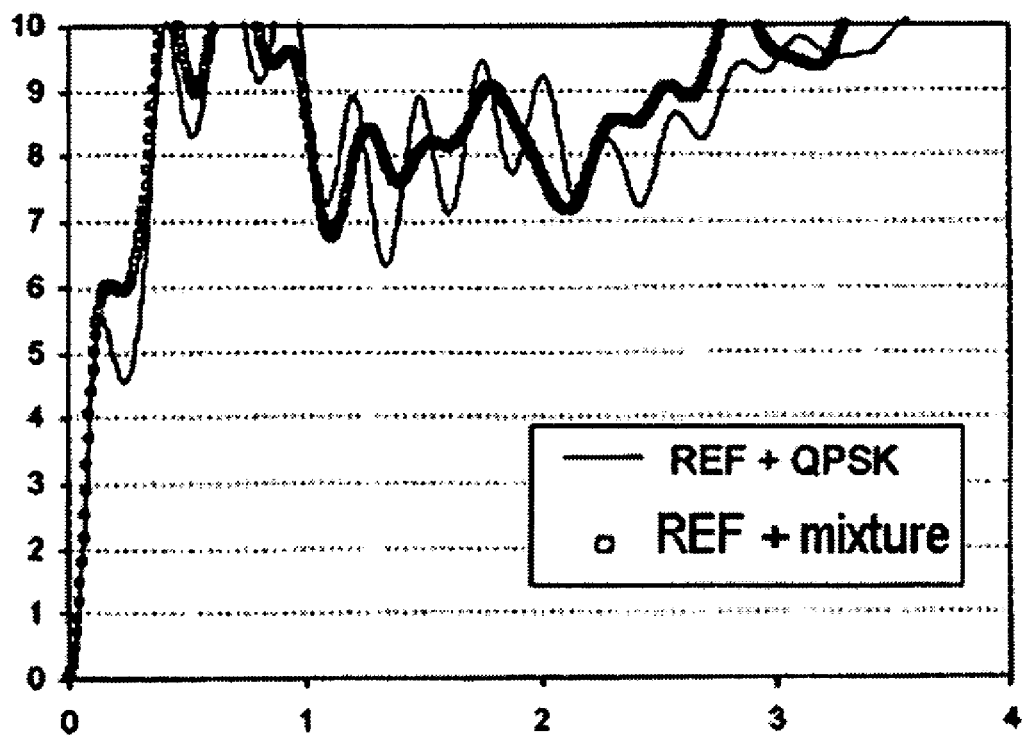
Figure 6:
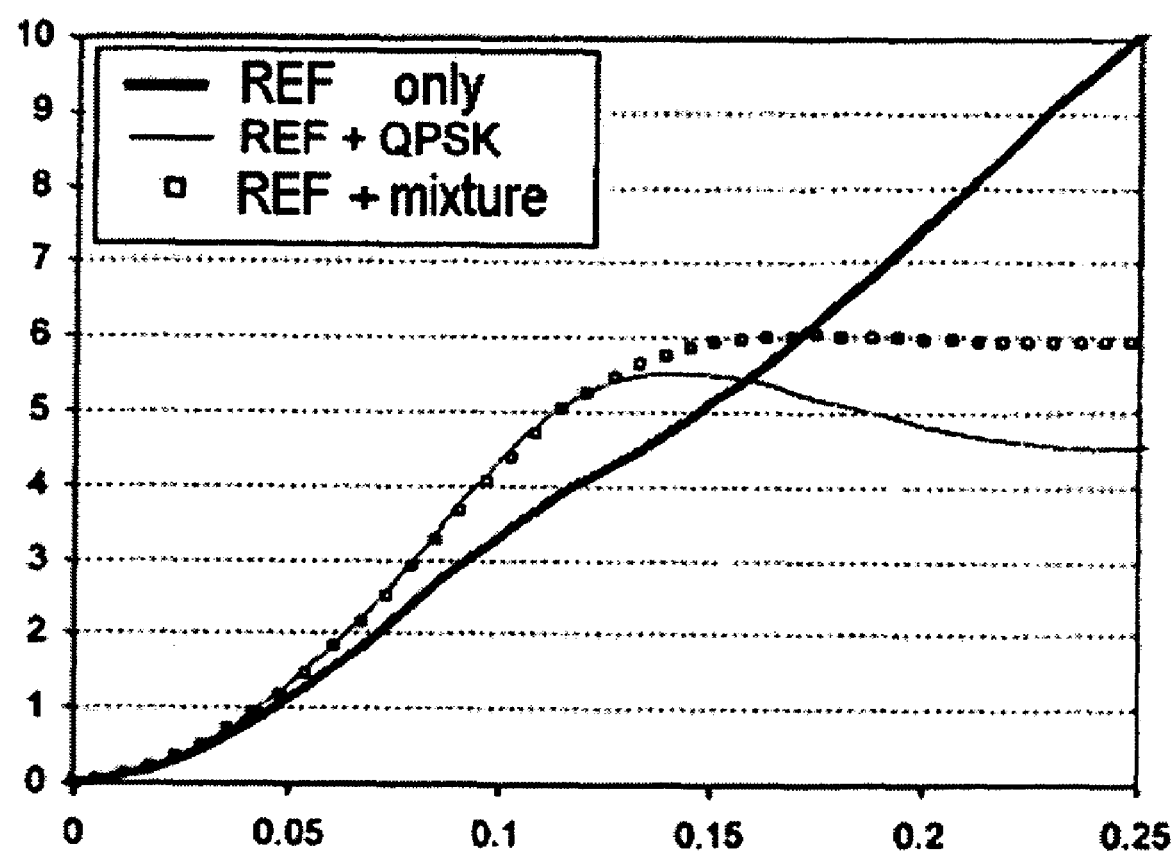

FIGS. 5 and 6 show the gain afforded by the system according to the invention within the framework of the packet transmission of ATM (Asynchronous Transfer Management) cells of 424 bits. These figures indicate the cost function for the frequency error made by the modem. These cost curves are the image of the square error for the zero frequency. An abscissa of x indicates a frequency error corresponding to a rotation of x revolutions on the burst length.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of demodulating a signal having data symbols and reference symbols, comprising steps of using semi-pilot symbols that transport less information than symbols customarily used but which allow a demodulator better decision-taking for its decided estimations, before a decoding step.

2. The demodulating method as claimed in claim 1, comprising a step of inserting semi-pilot symbols between the data symbols and the reference symbols, when the data sources are of different value or importance, the semi-pilot symbols then transmitting the information that is most protected.

3. The method as claimed in claim 1, wherein the semi-pilot symbols are disposed at the end of the frame of the signal.

4. The method as claimed in claim 1, wherein for the semi-pilot symbols a sub-constellation of the constellation used for the modulation is used.

5. The method as claimed in claim 1, wherein BPSK symbols are used as semi-pilot symbols when QPSK modulation is employed.

6. The method as claimed in claim 1, wherein QPSK symbols are used as semi-pilot symbols when 8 PSK modulation is employed.

7. The method as claimed in claim 1, wherein QPSK symbols are used when 16 QAM modulation is employed.

8. The method as claimed in claim 1, wherein semi-pilot symbols arising from a different constellation are used as semi-pilot symbols.

9. A device for demodulating a signal comprising data symbols and reference symbols, wherein it comprises at least one demodulator suitable for implementing the steps of the method as claimed in claim 1.

* * * * *